United States Patent [19]
Neill et al.

[11] Patent Number: 5,457,296
[45] Date of Patent: Oct. 10, 1995

[54] CIRCUIT BREAKER ENCLOSURE

[75] Inventors: Kenneth Neill; Keith W. Ball, both of Swindon, United Kingdom

[73] Assignee: Square D Company, Palatine, Ill.

[21] Appl. No.: 211,023

[22] PCT Filed: Jul. 19, 1993

[86] PCT No.: PCT/US93/06749

§ 371 Date: Jun. 15, 1994

§ 102(e) Date: Jun. 15, 1994

[87] PCT Pub. No.: WO94/02979

PCT Pub. Date: Feb. 3, 1994

[30] Foreign Application Priority Data

Jul. 17, 1992 [GB] United Kingdom .................. 9215302

[51] Int. Cl.⁶ .................................................. H01H 9/02
[52] U.S. Cl. ............................................ 200/306; 200/333
[58] Field of Search ................................. 200/306, 400, 200/401, 333, 334, 147 R, 148 R, 149 R

[56] References Cited

U.S. PATENT DOCUMENTS

| | | | |
|---|---|---|---|
| 2,863,969 | 12/1958 | Edmunds | 200/306 |
| 3,328,553 | 6/1967 | Gryetko | 200/293 |
| 3,506,799 | 4/1970 | Ellsworth et al. | 200/306 |
| 4,218,596 | 8/1980 | Clausing | 200/144 R |
| 4,261,189 | 4/1981 | Brumfield, Jr. et al. | 70/84 |
| 4,631,376 | 12/1986 | Leone | 200/306 |
| 4,672,157 | 6/1987 | Neel et al. | 200/306 |
| 4,876,424 | 10/1989 | Leone | 200/306 |
| 5,064,977 | 11/1991 | Fierro | 200/293 |

Primary Examiner—Henry J. Recla
Assistant Examiner—David J. Walczak
Attorney, Agent, or Firm—Larry I. Golden; Kareem M. Irfan; Wayne Stopplemoor

[57] ABSTRACT

An enclosure, for a circuit breaker, is provided with a venting arrangement to allow release of internal pressure caused by a short circuit fault condition in the circuit breaker. The venting arrangement is provided in the form of a blow out panel mounted over an aperture formed in the enclosure. Insulating barriers are provided to prevent vented exhaust particles from coming into contact with electrically live conductors.

4 Claims, 4 Drawing Sheets

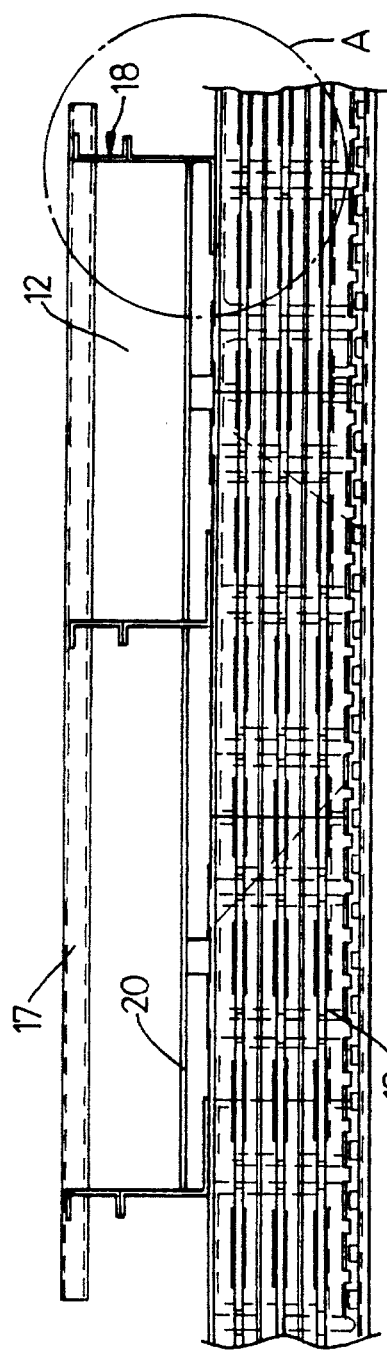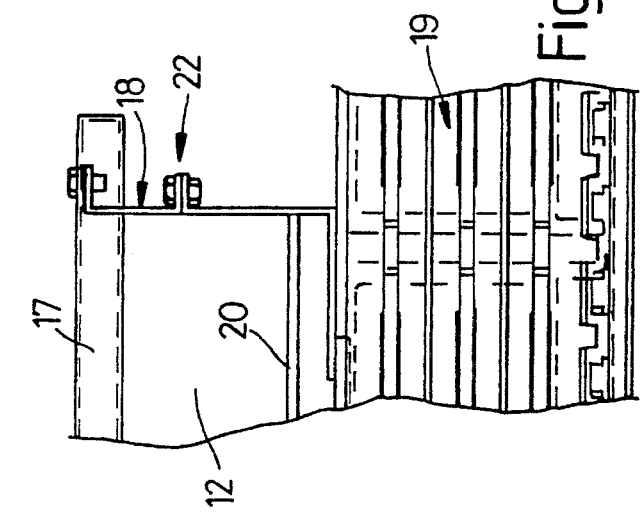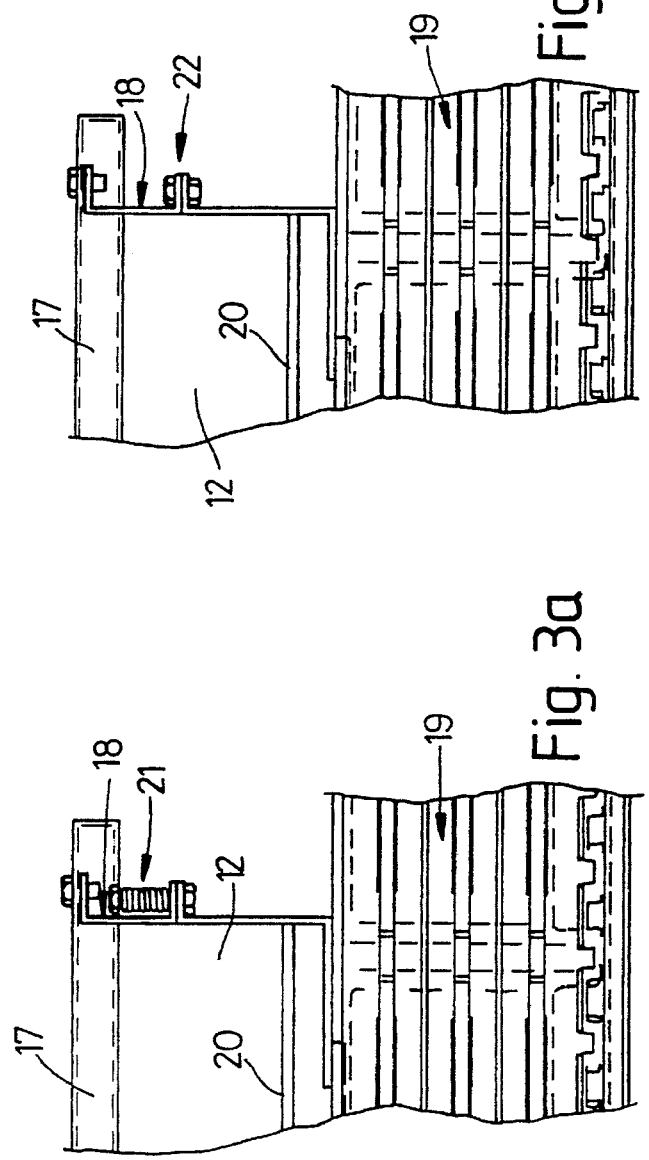

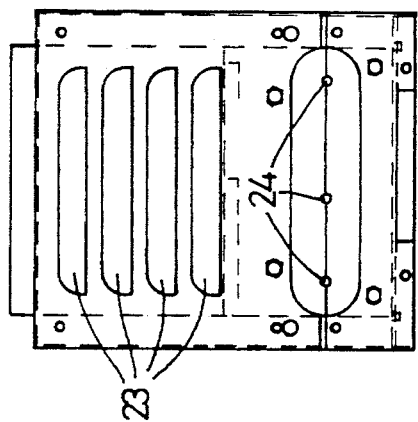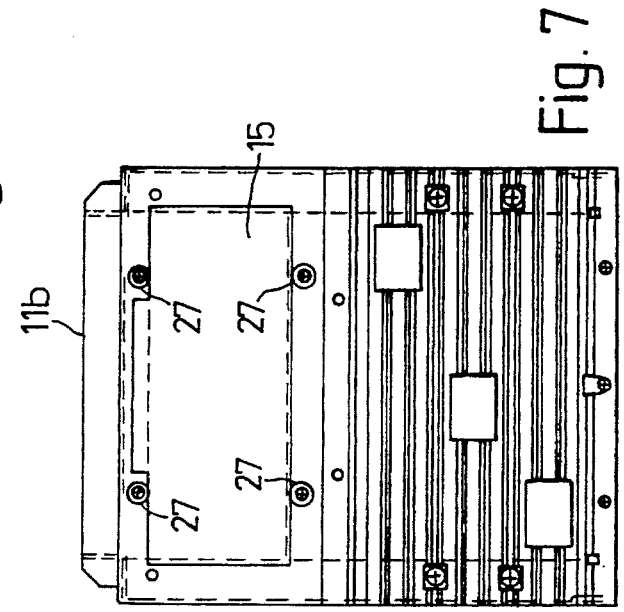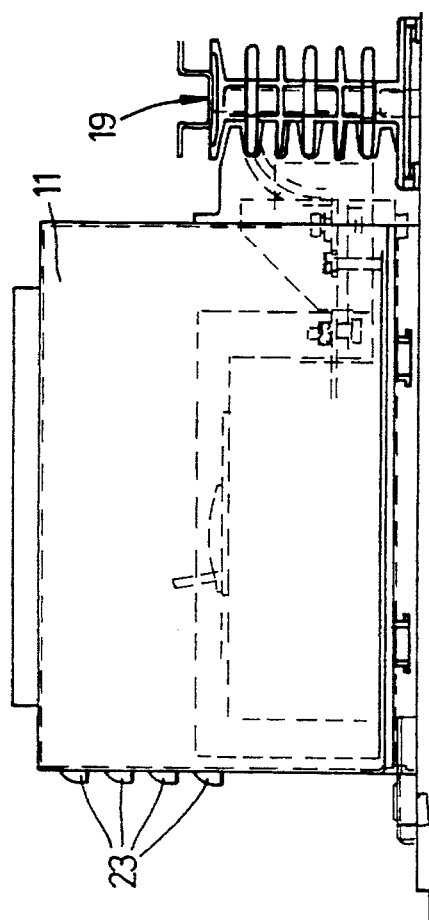

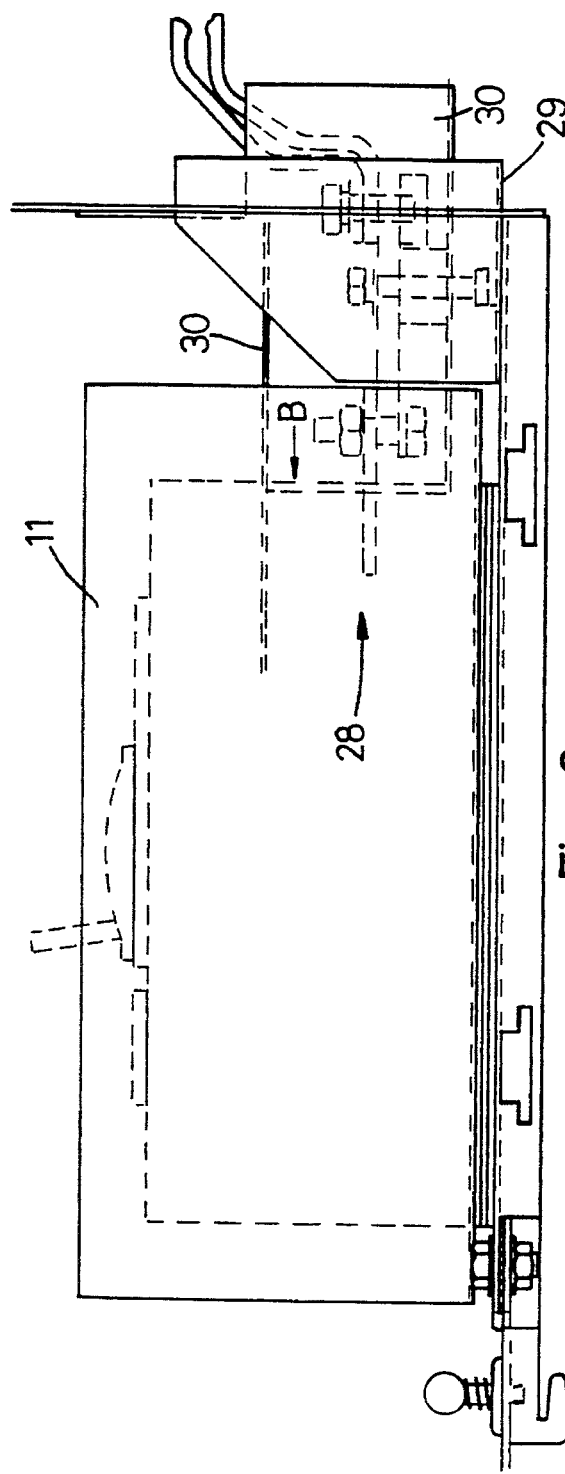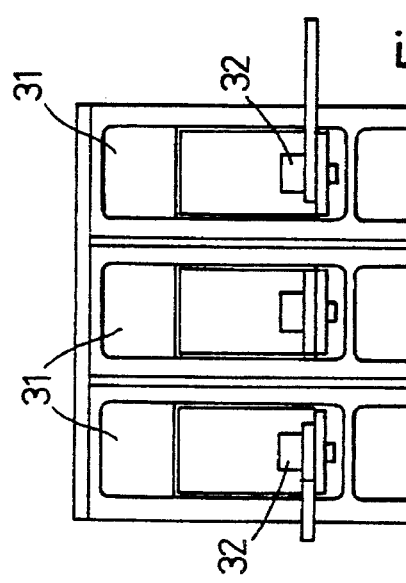

CIRCUIT BREAKER ENCLOSURE

The invention relates to circuit breakers and more particularly to moulded case circuit breakers (M.C.C.B), enclosures therefor and to an I-line panelboard for mounting such circuit breaker enclosures.

With M.C.C.B.'s fitted with enclosures problems can occur when such breakers open under short circuit conditions since gas and particles are generated under such conditions. This can cause problems with damage to the M.C.C.B. enclosure by pressure build up and furthermore the generated particles can impair the dielectric withstand of the electrical circuits throughout the panelboard assembly.

It is an object of the present invention to obviate or mitigate these above disadvantages.

According to one aspect of the invention there is provided an enclosure, for a circuit breaker, formed with at least one venting arrangement to allow release of internal pressure caused by short circuit fault conditions, in use.

A venting arrangement may be provided in the form of a glow out panel or a flap mounted over an aperture formed in the enclosure and the panel or flap may be formed of synthetic plastics material.

In addition or alternatively a venting arrangement may comprise louvres formed in the enclosure.

Insulating barriers may be located to prevent vented exhaust particles form coming into contact with electrically live conductors, in use.

According to a further aspect of the invention there is provided an I-line panelboard for locating a plurality of circuit breaker assemblies therein, the panelboard being formed to provide a central vertical expansion chamber located between two vertical stacks of juxtaposed plug-in circuit breaker assemblies.

A panel of synthetic plastics material may be located at the lower end of the expansion chamber for protecting a bus stack located therebelow.

A fixed or sprung loaded centre cover may be located over the vertical expansion chamber.

The panelboard may have a plurality of circuit breaker enclosures, as defined in the fourth to seventh paragraphs hereinbefore, located therein.

The foregoing and further features of the invention may be more readily understood from the following description of preferred embodiments thereof, by way of example, with reference to the accompanying drawings, in which:

FIG. 2 is a side elevational view of a portion of the panelboard of FIG. 1 showing a centre cover located thereon;

FIGS. 3a and 3b are view, on enlarged scale, of the circled portion A of FIG. 2 showing alternative fixings for the centre cover;

FIG. 4 is a side elevational view of an M.C.C.B. enclosure plug-in unit inserted into the stack of the panelboard;

FIG. 5 is an end elevational view of the end of the unit of FIG. 4 remote from the stack;

FIG. 6 is an end elevational view of the other end of the unit of FIG. 4 adjacent to the stack;

FIG. 7 is an end elevational view of an alternative arrangement to FIG. 6;

FIG. 8 is a side elevational view of an alternative M.C.C.B. enclosure plug-in unit, and FIG. 9 is an end elevational view in the direction of arrow B on FIG. 8.

Figure 1:
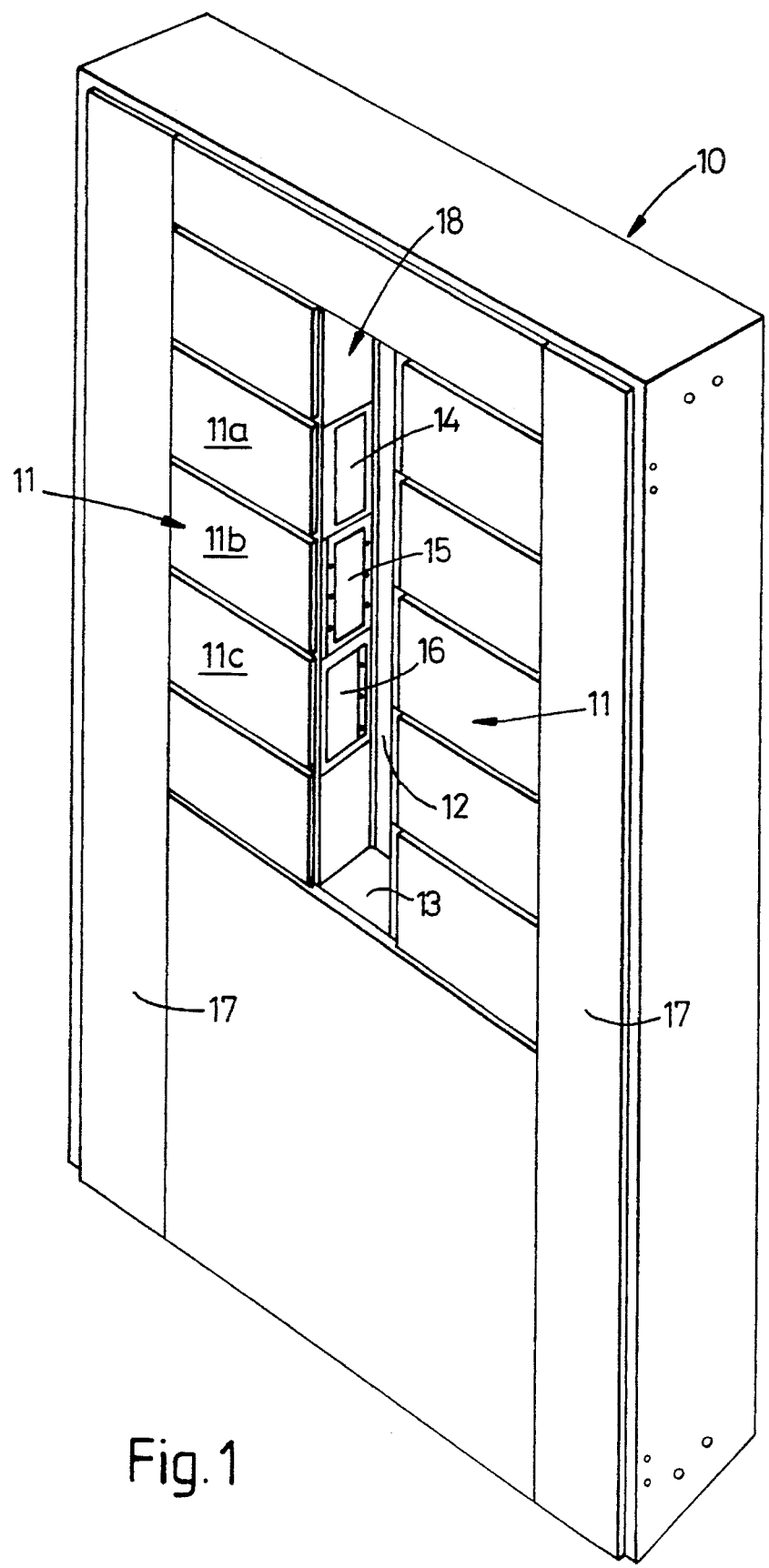
FIG. 1 is a perspective view of the front of an I-line panelboard.

Referring now firstly to FIG. 1 there is shown an I-line panelboard assembly 10 with two vertical stacks of plug-in enclosed M.C.C.B.'s 11 shown located in their plugged-in positions. Each of the M.C.C.B.'s enclosures 11 is vented into a central vertical expansion chamber 12 an a cover 13 of synthetic plastics material is located at the lower end for protecting a bus stack (not shown) located therebelow. The M.C.C.B.'s enclosures 11 may be vented in a plurality of forms with enclosure 11a being formed with a vent opening 14, enclosure 11b having a panel 15 which is secured at its edges to form a "blow-out" panel and enclosure 11c having a flap 16 which is rigidly secured at one edge and which may be perforated, both the panel 15 and the flap 16 being formed of synthetic plastics material. The detail of such venting will be described in more detail hereinafter. Customer cabling compartments are located vertically at each side of the assembly 10 beneath panels 17. A central cover 18 (FIG. 2) is located over the expansion chamber 12 in the position indicated by arrow 18a.

Referring now to FIG. 2 there is shown the panelboard bus stack 19, the central cover 18 which is located over the expansion chamber 12 and a stack barrier 20 located between stack 19 and cover 18. FIG. 3a shows, on enlarged scale, the circled portion A in FIG. 2 and shows the detail of an assembly 21 comprising a nut and bolt fixing with a pre-loaded spring to enable release movement of cover 18 should there be excessive pressure build-up within chamber 12. FIG. 3b shows a similar view to FIG. 3a but with a fixed nut and bolt assembly 22.

Referring now to FIGS. 4 and 5 there is shown an enclosure 11 which is plugged-in to stack 19. With this enclosure 11 the outer end face is formed with venting louvres 23 which may be provided as an alternative or additional to an aperture 14, panel 15 or flap 16 at the stack engaging end. Cable entry into the enclosure 11 is via holes 24 which are drilled to suit the cable size to be utilized.

Referring now to FIG. 6 there is shown an end elevational view of the enclosure 11c of FIG. 1 on enlarged scale. The flap 16 is rigidly located along the base by screws 25 and a slotted perforation 26 provided to enable hingeing or snap-off with pressure build up within enclosure 11c. FIG. 7 shows a similar view to FIG. 6 for the enclosure 11b, in which panel 15 is located by the edges of screw mounted washers 27 so as to provided a "blow-out" panel with pressure build up within enclosure 11b.

Referring now to FIGS. 8 and 9 there is shown a further enclosure 11 with details of protection of the electrical connections 28 from contamination from generated particles when the breaker opens under short circuit conditions. An indicating barrier 29 is provided at the outer edges of the connections and further barriers 30 are provided between the connections. Furthermore barriers 31 are located over and around the terminal pads 32 of the breaker.

Hence it will be seen that when breakers open under short circuit conditions the arrangements shown provide venting of gas pressure/particles to both prevent mechanical damage which could result in the environmental degree of protection being impaired and that particles released to not contaminate the electrical connections.

We claim:

1. An enclosure, for enclosing a circuit breaker therein thereby segregating the circuit breaker from other circuit breakers, said enclosure is formed with a venting arrangement to allow release of internal pressure caused by short circuit fault conditions, wherein said venting arrangement includes an aperture, disposed in said enclosure; and a blow out panel secured at its edges over the entire aperture to thereby cover the aperture, but adapted to be blown open under high pressure conditions, to uncover said aperture, thereby releasing the pressure out of said enclosure.

2. An enclosure as claimed in claim 1 wherein the panel is formed of synthetic plastics material.

3. An enclosure as claimed in any preceding claim including insulating barriers adapted to prevent vented exhaust particles from coming into contact with electrical connections, wherein said insulating barriers are located around the connections.

4. An enclosure assembly for enclosing a circuit breaker therein, said enclosure assembly comprising:

an enclosure for enclosing the circuit breaker therein thereby segregating the circuit breaker from other circuit breakers, said enclosure including electrical connections for coupling wire conductors to the circuit breaker;

a venting arrangement, disposed in said enclosure, for releasing internal pressure caused when the circuit breaker interrupts under a short circuit fault condition, said arrangement including an aperture formed in said enclosure; and a blow-out panel secured at its edges over the entire aperture to thereby cover the aperture, but adapted to be blown open under high pressure conditions, to uncover said aperture, thereby releasing the high pressure out of said enclosure; and a set of barriers adapted for surrounding the electrical connections, said barriers prevent contamination to the electrical connections from particles generated when the circuit breaker interrupts due to the short circuit condition.

* * * * *